United States Patent [19]

Saito et al.

[11] Patent Number: 5,082,725
[45] Date of Patent: Jan. 21, 1992

[54] MATERIAL FOR GASKET

[75] Inventors: Hiroshi Saito; Michihiro Inagaki, both of Nara, Japan

[73] Assignee: Nichias Corporation, Tokyo, Japan

[21] Appl. No.: 648,224

[22] Filed: Jan. 31, 1991

[30] Foreign Application Priority Data

Feb. 1, 1990 [JP] Japan .................................. 2-20482

[51] Int. Cl.$^5$ .............................................. B32B 3/26
[52] U.S. Cl. ................................ 428/304.4; 428/313.5; 428/317.9; 428/319.1
[58] Field of Search ............... 428/304.4, 313.5, 317.9, 428/319.1

[56] References Cited

U.S. PATENT DOCUMENTS 4,906,501 3/1990 Homma et al. .................. 428/319.1

FOREIGN PATENT DOCUMENTS

| 55-31000 | 3/1980 | Japan | 428/317.9 |
| 62-170339 | 7/1987 | Japan | 428/319.1 |
| 1372845 | 11/1974 | United Kingdom | 428/313.5 |

Primary Examiner—William J. Van Balen
Attorney, Agent, or Firm—Flynn, Thiel, Boutell & Tanis

[57] ABSTRACT

A material for gasket, in which gam foam layers are formed on a metal plate, is disclosed, in which the gum foam layers stated above include organic and/or inorganic fiber, and which can prevent blowing out and wear of the gum foam layers at a high pressure sealing.

3 Claims, 1 Drawing Sheet

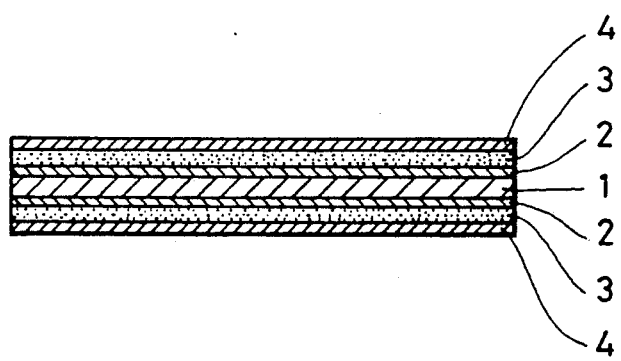

MATERIAL FOR GASKET

FIELD OF THE INVENTION

The present invention relates to an improvement of a material for gasket, in which gum foam layers are formed on surfaces of a metal plate.

BACKGROUND OF THE INVENTION

Heretofore, as this kind of materials for gasket, a material, in which gum foam layers 3 are formed on the two surfaces of a metal plate 1 through primer layers 2 and a non-adhesive layer 4 is formed on the surface of each of the gum foam layers, as indicated in the figure is widely utilized.

Since the material for gasket constructed as described above has a great compression resiliency owing to the gum foam layers formed by independent or continuous bubbles, no embossing operation (formation of beads) is required for gasket consisting of gum layers formed on the surfaces of a metal plate, but it is possible to obtain gasket products of high quality only by punching it in a predetermined shape.

However the material for gasket constructed as described above has problems as described below.

(A) The material for gasket, in which the gum foam layers are formed on the metal plate, has drawbacks that, since the gum layers serving as sealing layers are foamed, it is short in properties of matter such as tensile strength, stress relaxation, etc. and stress relaxation required for a sealing member is great, and that it can give rise to blowing out of the foam layers at a high pressure sealing, which takes place due to the fact that the strength of the gum foam layers is low, and to wear and shear deformation destruction of the gum form layers due to thermal contraction movement of an opposite flange member.

(B) In a gum form layer formed by using a prior art thermally decomposing foaming agent, the form cell diameter is great and further since it is formed by the normal pressure foaming method, independent bubbles and continuous bubbles exist mixedly. For this reason it has a drawback that fluid penetration into the gum foam layers through continuous bubble parts and stress relaxation of the gum form layer are great, which gives rise to decrease in the sealing property at a low pressure at the surface thereof.

OBJECT OF THE INVENTION

The present invention has been done in order to solve the problems described above and the principal object thereof is to provide a material for gasket, which can improve properties of matter such as tensile strength, stress relaxation, etc. while holding the excellent compression resiliency owing to the gum foam layer described previously and can present surely fluid penetration.

SUMMARY OF THE INVENTION

In order to achieve the above object, a first invention of the present application is characterized in that in a material for gasket, in which gum foam layers are formed on a metal plate, the gum foam layers stated above include organic and/or inorganic fiber.

A second invention of the present application is characterized in that in a material for gasket, in which gum foam layers are formed on a metal plate, the gum foam layers stated above include microscopic foam particles made of organic substance or inorganic substance in the form of independent bubbles.

A third invention of the present application is characterized in that in a material for gasket, in which gum foam layers are formed on a metal plate, the gum foam layers stated above include organic and/or inorganic fiber and microscopic foam, particles made of organic substance or inorganic substance in the form of independent bubbles.

In the material for gasket constructed as described above, improvement of the gum foam layer including fiber material in tensile strength, compression elasticity, stress relaxation, wear resistance, heat resistance, etc. can be achieved by reinforcing action of coupling between gum and fiber and intertwinement of fiber.

Further, in the gum foam layer including microscopic foam particles in the form of independent bubbles, since the gum foam layers includes completely independent bubbles having an extremely small bubble cell diameter, improvement in properties of matter can be achieved, which is almost identical to that obtained in the case of the gum foam layer including fiber described above and fluid penetration preventing action can be also achieved.

BRIEF DESCRIPTION OF THE DRAWING

A single figure is a cross-sectional showing the construction of a material for gasket.

DETAILED DESCRIPTION

Although the organic and the inorganic substance mixed to be used in the gum foam layer according to the present invention are not specifically restricted, synthetic fibers well known heretofore such as aromatic polyamide fiber, aromatic polyester fiber, polyester fiber, nylon fiber, etc. are widely used for the organic fiber. Among them fibrillated aromatic polyamide fiber (trade mark "Kevler Pulp") is specifically preferable. Glass fiber, alumina fiber, wisker fiber, etc. can be used for the inorganic fiber.

Further, according to the present invention, extremely small independent bubbles are formed in the gum foam layer. For the microscopic foam particles it is preferable to use foam particles called generally foaming micro-capsules or micro-balloons.

The foaming micro-capsules (e.g. "Micro-Sphere" made by Matsumoto Yushi Seiyaku KK. (Matsumoto Oil and Fat Drug Manufacturing Co., Ltd.), "Expancel" made by Kemanobel Co. in Sweden, etc.) are capsuled extremely small particles having an outer shell made of polymer such as vinylidene chloride, acrylonitrile, etc. enclosing isobutane gas as an inflating agent. When they are heated, the outer shell is softened and the whole is inflated by the expansion of the enclosed gas, as if it were a ping-pong ball. When they are mixed in a gum material, they are capsuled by heat at the vulcanization and the gum material is transformed into a gum foam layer including independent bubbles.

On the other hand, the micro-balloon is a general term for inorganic balloons (sold in the market under a trade mark "Fillite"), which are extremely small hollow shells made of an inorganic substance such as silica, and organic balloons, which are hollow shells formed by foaming previously foaming micro-capsules described previously. The gum material is transformed into a gum foam layer including completely independent bubbles by mixing them therein.

In the case where the foaming micro-capsule, the organic micro-balloon and the inorganic micro-balloon described above are used, it is not necessary to add any foaming agent in gum compound, which is to be vulcanized and formed. On the contrary, in the case where only fiber material is used, an inflating agent is necessary.

In the gum foam layer including a fiber material, remarkable improvement in properties of matter of the gum foam layer such as tensile strength, compression elasticity, stress relaxation, wear resistance, heat resistance, etc. can be achieved by coupling between the gum material and the fiber and intertwinement of fibers. In particular, effects can be obtained to prevent blowing out of the foam layer at a high pressure sealing as well as wear and shear deformation due to thermal contraction movement of an opposite flange member.

The effects described above obtained by using the fiber material are almost identical to each other for use of organic fiber or inorganic fiber alone and use of mixture thereof. However, when inorganic fiber is used, the heat resistance thereof is increased.

Further, when organic fiber material is used, the coupling force between the fiber and the gum can be increased (chemical reinforcement) by adding a reforming agent giving rise to chemical bonding between functional groups of organic short fibers and gum molecules (bonding aiding agent having a reactive polar radical (carboxyl radical, amine radical, etc.)) to the gum compound or by using fiber, to extremities or side chains of molecules of which carboxyl radicals, amine radicals, epoxy radicals, etc. having a high chemical bonding force with gum molecules are graft-polymerized, so that properties of matter of the gum foam layer such as tensile strength stress relaxation, wear resistance, etc. can be further improved.

On the other hand, in the gum foam layer including foaming micro-capsules or organic or inorganic micro-balloons, since a layer including completely independent bubbles having an extremely small foam cell diameter can be obtained, remarkable improvement in properties of matter such as tensile strength, compression elasticity, stress relaxation, prevention of fluid penetration, etc. In particular, since creep at clamping the gasket is small, lowering in the stress relaxation and fluid penetration into the gum foam layer at a low pressure at the surface thereof can be completely prevented.

The effects described above are almost identical to each other for use of foaming micro-capsules, or organic or inorganic micro-balloons alone and use of mixture thereof. However, when inorganic micro-balloons are used, heat resistance can be increased.

In the gum foam layer, in which both fiber material and foaming micro-capsules, or organic or inorganic micro-balloons are used, properties of matter of the gum foam layer such as strength, compression elasticity, stress relaxation, wear resistance, heat resistance, etc. are further improved by the multiplication effect thereof.

Hereinbelow some concrete embodiments of the present invention will be explained.

EMBODIMENT (1)

A cold milled steal plate 0.25 mm thick is used for the metal plate. The surfaces thereof are treated with an alkali degreasing agent. Thereafter they are polished by the scotch bright method and roughened. Next antirust films made of iron phosphate are formed thereon by subjecting it to a phosphate forming treatment. Then primer, whose principal component is phenol resin, reformed with NBR gum compound, is applied on both the surfaces thereof to form primer layers.

Subsequently, a gum compound solution having a composition indicated in the following table is applied on the primer layers described above at a predetermined thickness. Dispersion of graphite is applied further thereon after having desiccated it to form non-adhesive layers. A material for gasket having gum foam layers, which was 350 μm thick on each surface, was obtained by vulcanizing it in 10 to 20 minutes at 180° C. and at the same time foaming it.

| Composition of Gum Compound | |
|---|---|
| nitrile gum | 100 PHR |
| hydrozincite | 3~10 |
| stearic acid | 0.3~1.0 |
| carbon | 30~150 |
| coumarone-indene resin | 0~20 |
| deterioration preventing agent | 0~10 |
| plasticizer | 0~20 |
| wax | 0~5 |
| foaming agent (ADCA group) | 5~30 |
| aromatic polyamide fiber | 5~30 |
| sulphur | 0.5~4 |
| vulcanization accelerating agent | 2~6 |

EMBODIMENT (2)

A gum compound having a composition indicated in the following table was used and a material for gasket having gum foam layers, each of which was 350 μm thick, was obtained according to the same specification as that used in EMBODIMENT (1).

| Composition of Gum Compound | |
|---|---|
| nitrile gum | 100 PHR |
| hydrozincite | 3~10 |
| stearic acid | 0.3~1.0 |
| carbon | 30~150 |
| coumarone-indene resin | 0~20 |
| deterioration preventing agent | 0~10 |
| plasticizer | 0~20 |
| wax | 0~5 |
| foaming agent (ADCA group) | 5~30 |
| alumina fiber (treated with silan-coupling agent) | 5~30 |
| sulphur | 0.5~4 |
| vulcanization accelerating agent | 2~6 |

EMBODIMENT (3)

A gum compound having a composition indicated in the following table was used and a material for gasket having gum foam layers, each of which was 350 μm thick, was obtained according to the same specification as that used in EMBODIMENT (1).

| Composition of Gum Compound | |
|---|---|
| nitrile gum | 100 PHR |
| hydrozincite | 3~10 |
| stearic acid | 0.3~1.0 |
| carbon | 30~150 |
| coumarone-indene resin | 0~20 |
| deterioration preventing agent | 0~10 |
| plasticizer | 0~20 |
| wax | 0~5 |
| foaming micro-capsule | 5~40 |
| sulphur | 0.5~4 |

| Composition of Gum Compound | |
|---|---|
| vulcanization accelerating agent | 2~6 |

EMBODIMENT (4)

A gum compound having a composition indicated in the following table was used and a material for gasket having foam layers, each of which was more than 200 μm thick, was obtained according to the same specification as that used in EMBODIMENT (1).

| Composition of Gum Compound | |
|---|---|
| nitrile gum | 100 PHR |
| hydrozincite | 3~10 |
| stearic acid | 0.3~1.0 |
| carbon | 30~150 |
| coumarone-indene resin | 0~20 |
| deterioration preventing agent | 0~10 |
| plasticizer | 0~20 |
| wax | 0~5 |
| alumina fiber (treated with silan-coupling agent) | 5~30 |
| inorganic micro-balloon (silica balloon) | 100~300 |
| sulphur | 0.5~4 |
| vulcanization accelerating agent | 2~6 |

EMBODIMENT (5)

A gum compound having a composition indicated in the following table was used and a material for gasket having gum foam layers, each of which was 120 μm thick, was obtained according to the same specification as that used in EMBODIMENT (1).

| Composition of Gum Compound | |
|---|---|
| nitrile gum | 100 PHR |
| hydrozincite | 3~10 |
| stearic acid | 0.3~1.0 |
| carbon | 30~150 |
| coumarone-indene resin | 0~20 |
| deterioration preventing agent | 0~10 |
| plasticizer | 0~20 |
| wax | 0~5 |
| aromatic polyamide fiber | 5~30 |
| reactive reforming agent (reactive (carboxyl radical) thermoplastic elastomer) | 10~40 |
| foaming micro-capsule | 5~40 |

EMBODIMENT (6)

A gum compound having a composition indicated in the following table was used and a material for gasket having gum foam layers, each of which was 120 μm thick, was obtained according to the same specification as that used in EMBODIMENT (1) (except that a stainless steel plate subjected to a forming treatment is used).

| Composition of Gum Compound | |
|---|---|
| nitrile gum | 100 PHR |
| hydrozincite | 3~10 |
| stearic acid | 0.3~1.0 |
| carbon | 30~150 |
| coumarone-indene resin | 0~20 |
| deterioration preventing agent | 0~10 |
| plasticizer | 0~20 |
| wax | 0~5 |
| aromatic polyester fiber | 5~30 |
| reactive reforming agent (carbonic acid reformed NBR) | 10~40 |
| foaming micro-capsule | 5~40 |

EMBODIMENT (7)

A gum compound having a composition indicated in the following table was used and a material for gasket having gum foam layers, each of which was 200 μm thick, was obtained according to the same specification as that used in EMBODIMENT (1).

| Composition of Gum Compound | |
|---|---|
| nitrile gum | 100 PHR |
| hydrozincite | 3~10 |
| stearic acid | 0.3~1.0 |
| carbon | 30~150 |
| coumarone-indene resin | 0~20 |
| deterioration preventing agent | 0~10 |
| plasticizer | 0~20 |
| wax | 0~5 |
| aromatic polyamide fiber | 5~30 |
| organic micro-balloon | 100~300 |

EMBODIMENT (8)

A gum compound having a composition indicated in the following table was used and a material for gasket having gum foam layers, each of which was 120 μm, was obtained according to the same specification as that used in EMBODIMENT (1) (except that an aluminum plate 0.25 mm thick was used without degreasing treatment, treated with chromic acid).

| Composition of Gum Compound | |
|---|---|
| nitrile gum | 100 PHR |
| hydrozincite | 3~10 |
| stearic acid | 0.3~1.0 |
| carbon | 30~150 |
| coumarone-indene resin | 0~20 |
| deterioration preventing agent | 0~10 |
| plasticizer | 0~20 |
| wax | 0~5 |
| foaming micro-capsule | 5~40 |

EMBODIMENT (9)

A gum compound having a composition indicated in the following table was used and a material for gasket having gum foam layers, each of which was 120 μm thick, was obtained according to the same specification as that used in EMBODIMENT (1) (except that an aluminum plate 0.25 mm thick having roughened surfaces, without degreasing treatment, treated with chromic acid).

| Composition of Gum Compound | |
|---|---|
| nitrile gum | 100 PHR |
| hydrozincite | 3~10 |
| stearic acid | 0.3~1.0 |
| carbon | 30~150 |
| coumarone-indene resin | 0~20 |
| deterioration preventing agent | 0~10 |
| plasticizer | 0~20 |
| wax | 0~5 |

| Composition of Gum Compound | |
| --- | --- |
| aromatic polyamide fiber | 5~30 |
| reactive reforming agent (NBR reformed with secondary amine) | 10~40 |
| foaming agent (ADCA group) | 5~30 |

EXAMPLE FOR COMPARISON (1)

A gum compound having a composition indicated in the following table was used and a material for gasket having gum foam layers, each of which was 350 μm thick, was obtained according to the same specification as that used in EMBODIMENT (1).

| Composition of Gum Compound | |
| --- | --- |
| nitrile gum | 100 PHR |
| hydrozincite | 0.3~10 |
| stearic acid | 0.3~1.0 |
| carbon | 30~150 |
| coumarone-indene resin | 0~20 |
| deterioration preventing agent | 0~10 |
| plasticizer | 0~20 |
| wax | 0~5 |
| foaming agent (ADCA group) | 5~30 |

As explained above, according to the present invention, remarkable effects can be obtained in the following view points with respect to a prior art material for gasket, in which gum foam layers are formed on a metal plate.

(1) In the gum foam layer including a fiber material, owing to the fact that it is reinforced by fiber, strength of the gum foam layer is increased. In particular, blowing out of the layer, which can be produced at a high pressure sealing, and wear due to friction with an opposite member are prevented.

Further, by the fact that it is reinforced by fiber, compression elasticity of the foam layer is increased and creep after clamping is decreased (stress relaxation is lowered).

(2) In the gum foam layer including foaming microcapsules or organic or inorganic micro-balloons, since a layer including completely independently bubbles having an extremely small foam cell diameter can be obtained, increase in strength can be obtained, similarly to the gum foam layer including fiber, and at the same time compression elasticity of the gum foam layer is increased and creep after clamping is decreased.

Further, owing to independent bubbles in the gum foam layer, fluid penetration into the foam layer is surely prevented.

What is claimed is:

1. A material for gasket, in which gum foam layers are formed on a metal plate, wherein said gum foam layers include organic and/or inorganic fiber.

2. A material for gasket, in which gum foam layers are formed on a metal plate, wherein said gum foam layers include microscopic foam particles made of organic substance or inorganic substance in the form of independent bubbles.

3. A material for gasket, in which gum foam layers are formed on a metal plate, wherein said gum foam layers include organic and/or inorganic fiber and microscopic foam particles made of organic substance or inorganic substance in the form of independent bubbles.

* * * * *